(No Model.)
T. A. EDISON.
COMMUTATOR FOR DYNAMO ELECTRIC MACHINES.
No. 379,944. Patented Mar. 27, 1888.
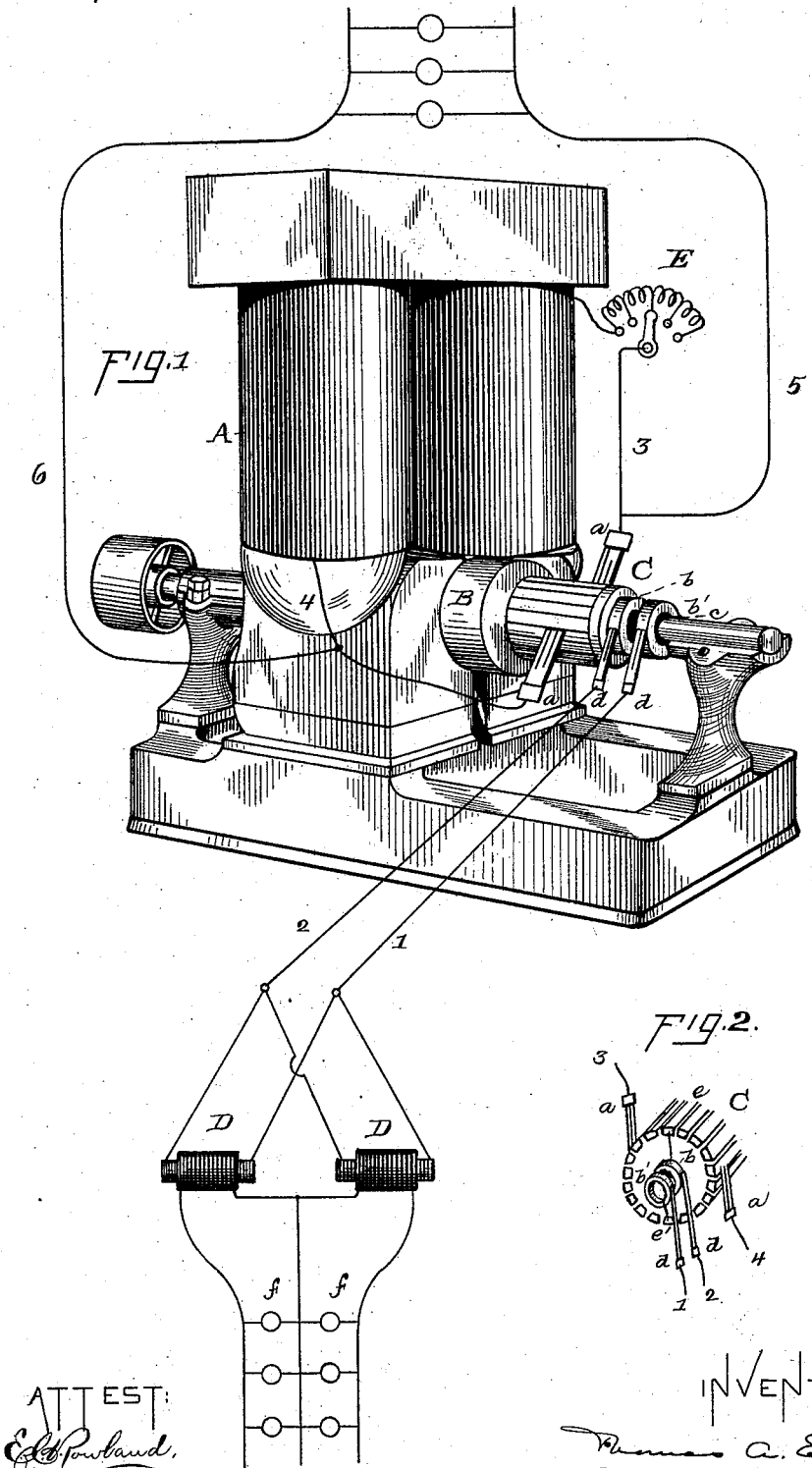

United States Patent Office.

THOMAS A. EDISON, OF LLEWELLYN PARK, NEW JERSEY.

COMMUTATOR FOR DYNAMO-ELECTRIC MACHINES.

SPECIFICATION forming part of Letters Patent No. 379,944, dated March 27, 1888.

Application filed December 6, 1886. Serial No. 220,798. (No model.)

*To all whom it may concern:*

Be it known that I, THOMAS A. EDISON, of Llewellyn Park, in the county of Essex and State of New Jersey, have invented a certain new and useful Improvement in Dynamo-Electric Machines, (Case No. 702,) of which the following is a specification.

My invention relates, mainly, to a dynamo-electric machine designed to produce both alternating and continuous currents, such machine being especially adapted for use as a source of high-tension current to be conveyed to a distance and converted by tension-reducers into a current of low tension adapted for lighting and similar purposes. The alternating current from the machine may be used for this purpose, while the continuous current is employed to energize the field-magnet of the machine, it being desirable to use a continuous current for this purpose. Translating devices may, however, be connected with the continuous-current circuit.

My invention is illustrated in the accompanying drawings, in which Figure 1 is a perspective view of a dynamo-electric machine embodying my invention with the circuits therefrom in diagram, and Fig. 2 a diagram of the commutator-connections.

A is the field-magnet, and B the armature, of a dynamo-electric machine, the latter being wound with a continuous coil connected at intervals with the conducting-bars of a commutator, C, whereby continuous currents are taken off by the commutator-brushes *a a*, bearing on opposite bars of the commutator. Placed upon the armature-shaft, between the commutator C and the shaft-bearing, is another commutator consisting of two continuous metal rings, *b b'*, placed upon a collar, *c*, of insulating material, whereby they are insulated from the shaft and from each other. Upon each of these rings a brush, *d*, bears. Ring *b* is connected, in any suitable manner, as shown in Fig. 2, with a commutator-bar, *e*, and ring *b'* is similarly connected with a diametrically-opposite bar, *e'*. A circuit, 1 2, extends from the brushes *d d*, and a circuit, 3 4, from the brushes *a a*. It will be seen that while a continuous current is given to circuit 3 4 there will be at each revolution a reversal of the current in circuit 1 2, whereby a rapidly-alternating current will be produced in said circuit. The circuit 1 2 is connected with the field-magnet coils of the machine, and therefore serves to energize the magnet by a continuous current.

I have shown the circuit 1 2 as extending to the multiple-arced primaries of induction-coils D D, from whose secondary circuits a three-wire multiple-series circuit, including electric lamps or other translating devices, *f f*, extends. The converters may, however, be otherwise constructed or arranged, or the circuit 1 2 may evidently be connected with electric lights or other translating devices.

I have shown a circuit, 5 6, shunted from the field-circuit 3 4, across which translating devices are placed in multiple arc, as shown, though they may be in series or multiple series. Such a circuit may be employed, if desired. The field-magnets should be wound with fine wire, so as to interpose a high resistance in the high-tension circuit. An adjustable resistance, E, may be provided to regulate the strength of the field-magnet.

What I claim is—

1. The combination, in a dynamo-electric machine, of an armature having a continuously-wound coil with two commutators on the shaft of said armature, each of which is directly connected with said coil, from one of which is derived a continuous current and from the other an alternating current, current collectors bearing on each of said commutators, and independent circuits extending therefrom, substantially as set forth.

2. The combination, in a dynamo-electric machine, of an armature having a continuously-wound coil connected at intervals to blocks of a commutator, two insulated rings on the armature-shaft, and connections from the armature-coil to said rings, substantially as set forth.

3. The combination, in a dynamo-electric machine, of an armature having a continuously-wound coil, a commutator composed of blocks, to all of which blocks said coil is connected at intervals, two insulated rings on the armature-shaft, and connections from the armature-coil to said rings, substantially as set forth.

4. The combination, in a dynamo-electric machine, of an armature having a continuously-wound coil, a commutator composed of blocks connected at intervals with said coil, two insulated rings on the armature-shaft, and connections from opposite blocks of the commutator to said rings, respectively, substantially as set forth.

This specification signed and witnessed this 26th day of November, 1886.

THOS. A. EDISON.

Witnesses:
WM. PELZER,
E. C. ROWLAND.